Patented Apr. 29, 1947

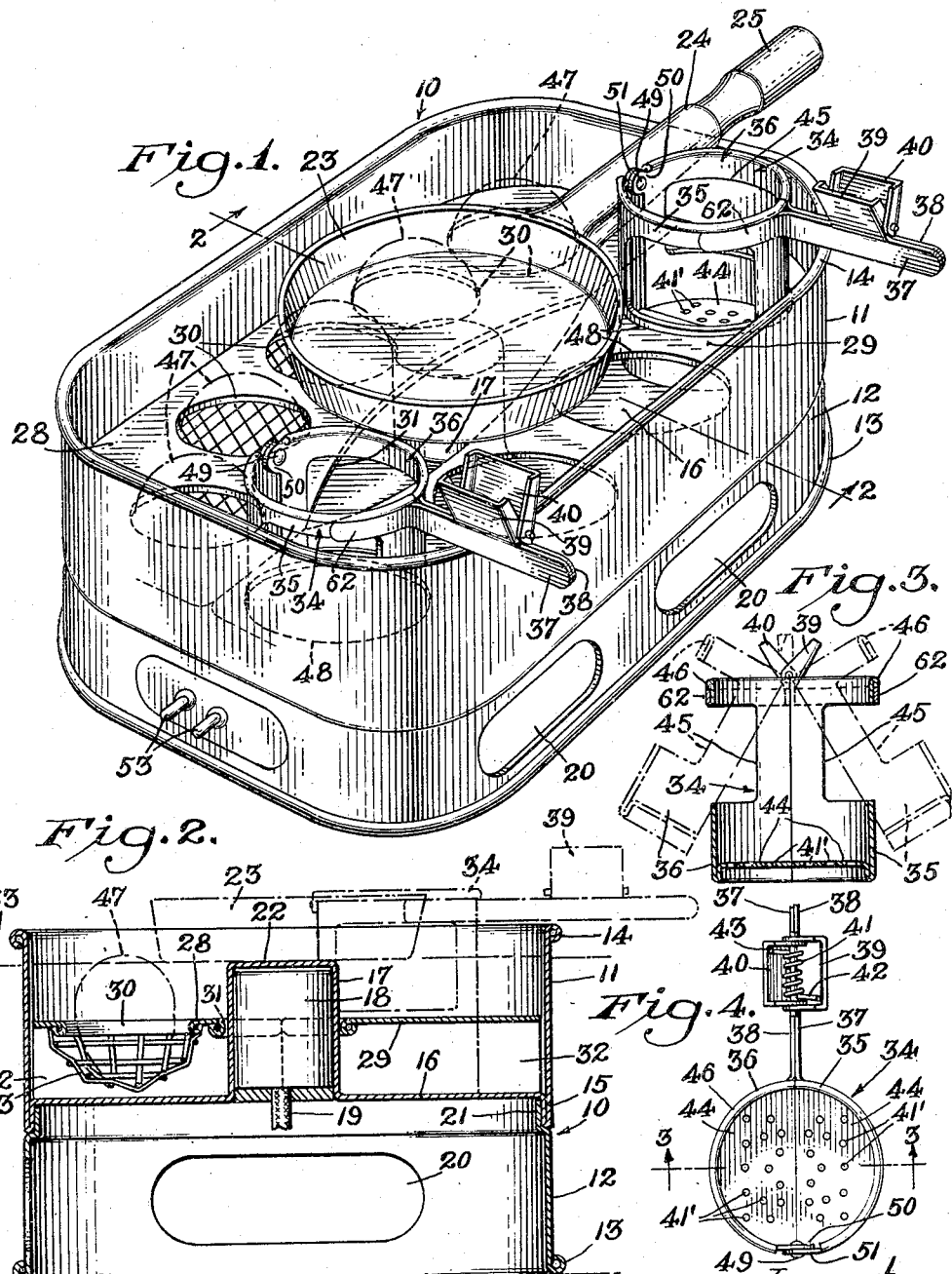

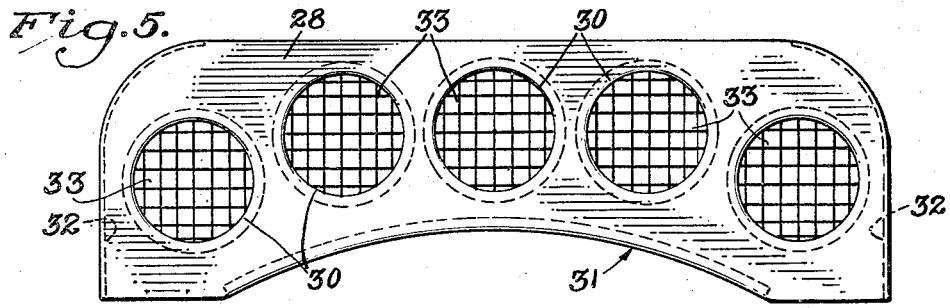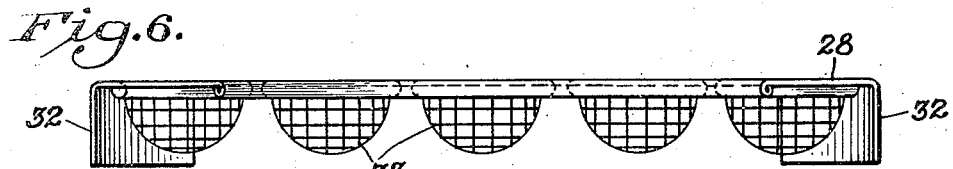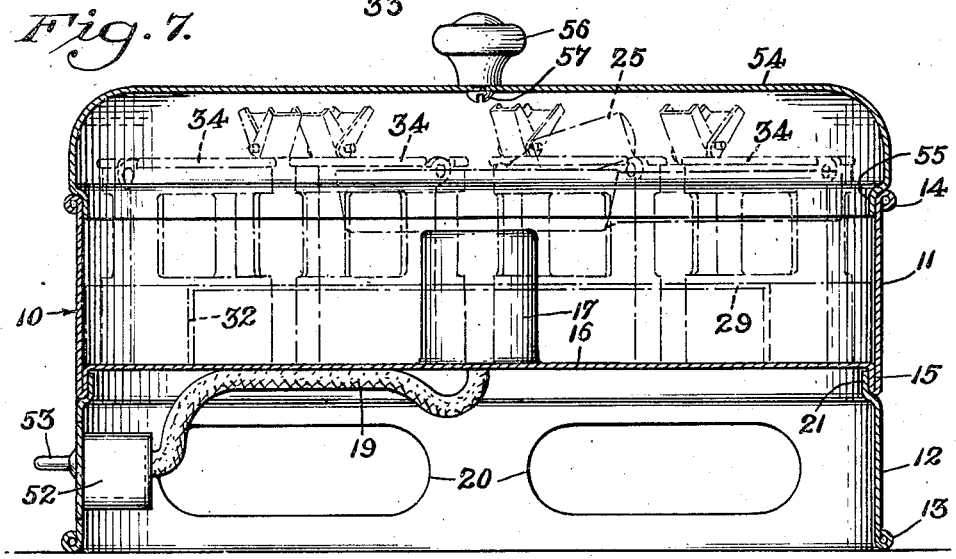

2,419,674

UNITED STATES PATENT OFFICE 2,419,674

COMBINATION EGG POACHING, BOILING, AND FRYING DEVICE

Sidney Caplan, Chicago, Ill.

Application September 26, 1944, Serial No. 555,814

8 Claims. (Cl. 99—339)

My invention relates to devices for cooking eggs, and is, preferably, to be manufactured in an embodiment in which a unitary construction may be utilized for poaching, boiling, or frying eggs, the said operations being performed either separately or simultaneously. Such devices would be of great benefit to the home as well as to larger food establishments such as restaurants, cafeterias, and the like.

A primary object of my invention is to provide a device of the aforementioned character having in combination elemental structure which will permit cooking eggs in any manner required such as boiling, poaching, or frying, the device being utilized for simultaneously performing all the cooking operations on a number of eggs, or the operations may be performed individually, namely, either boiling, poaching, or frying.

Another object of my invention is to provide in a device of the aforementioned character elemental structure for heating a liquid contained therein to perform the operations of boiling and poaching of eggs.

Another object of my invention is to provide unitary heating means which will heat the liquid in the unit for boiling and poaching eggs, and be so positioned as to support thereon a frying pan element for frying eggs.

Another object of my invention is to provide a device in which a single heating means is utilized to furnish heat for boiling or poaching thru convection and for frying purposes thru the principles of conduction.

Another object of my invention is to provide a unit for poaching eggs, having in the structure thereof means for releasing the poached egg when the operation is completed, ejecting the same by an articulate structure which will cause the device to open releasing the poached egg in the position most desired for placing either on a utensil, or on food substance such as slices of bread or toast.

Another object of my invention is to provide a poaching device having means incorporated therein for releasing a poached egg, positioning the same on a slice of bread or toast, and in combination therewith, a substantially, hemispherical mesh container adapted to nest within the said poaching unit so as to adapt the same for either boiling eggs or poaching them.

Another object of my invention is to provide a compact unit having in combination heating means, a series of poaching units as heretofore mentioned, a unit for supporting eggs in position for boiling operation, and also a frying pan unit having a separable handle so that all the units may be compactly assembled and held in assembly by a cover element adapted to enclose the same when the invention is not in use, thus making it advantageous to have such a device in a portable unit for camping purposes and other purposes, or by making the same in larger dimensions for restaurant or cafeteria use.

Another object of my invention is to provide a unit of the aforementioned character, namely for boiling, poaching and frying eggs, which is practical in construction, efficient in its use and operation, and of such simple structure as to warrant economical production thereof in quantities.

Other objects, features, and advantages inherent in my invention will become readily apparent to those familiar with the art, having reference to the accompanying drawings relatively described in the ensuing description, wherein like numerals are used to designate like parts, and in which:

Fig. 1 is a perspective view of the entire unit embracing my invention showing the lid removed therefrom ready for operation and use.

Fig. 2 is a transversal cross-sectional view on the line 2—2 of Figure 1.

Fig. 3 is a cross-sectional view taken on the line 3—3 of Figure 4 showing one of the poaching units utilized in connection with my invention.

Fig. 4 is a top view of one of the poaching units used in connection with the combination structure comprising my invention.

Fig. 5 is one of the removable supporting elements adapted to retain a number of eggs for boiling operation.

Fig. 6 is a front view of Figure 5.

Fig. 7 is a cross-sectional view showing the entire unit compactly assembled either for transporting the same or storing the same when not in use.

Fig. 8 is a slightly modified form of poaching unit comprising an element of my invention in combination with a wire mesh structure adapted to nest within the same permitting the combination to be used either for boiling and poaching individually, or separately, or simultaneously; the same being used in connection with a pot or pan or any like culinary utensil.

Fig. 9 is a detailed view of the handle structure embraced in the frying pan element, a part of my invention.

The unit shown in Figures 1 and 2 is, preferably, electrically heated so that if used in the home it may be attached to an electrical source of supply by an electric cord and be placed on the table where the cooking operations may be watched while the diners are partaking of their meals.

I wish to stress particularly, that the combined structural features embraced in my invention will permit all egg cooking operations to be performed either individually or simultaneously, giving each diner the choice of eggs being cooked in any particular style desired.

The invention is, generally, designated 10, and is comprised of an oblong upper section 11 secured to a similarly shaped lower section 12, each of the said sections being beaded as at 14 and 13 for reinforcement, and the upper section being reinforced at its lower portion as indicated at 15, resulting in a relieved bottom 16 into which is formed a pocket 17, adapted to receive a heating element 18. The said heating element 18 is connected to an electrical wire connection 19 which in turn is attached to the male plug 52, having the connecting terminals 53, adapted to engage a female receptacle or socket of a cord (not shown) which also terminates in a male plug adapted to be secured to a female receptacle of an electrical source of supply.

The lower section 12 and the upper section 11 may have wire reinforcement means within the beads 13 and 14 for further strengthening the units and making a rigid structure. Within the side of the unit 12 a number of ventilating openings 20 may be furnished in order to admit passage of circulatory currents of air, so that when resting the device on a table as a support, the heat will not cause the table or such article of furniture to be damaged.

The upper section 11 is adapted to receive therein two elements 28 and 29 which are removably positioned therein, the element 28 being provided with an arcuate recessed portion 31 to clear the electrical unit retaining portion 17, and is further provided with a number of circular openings 30 large enough to accommodate the diameter of an egg, and the said openings are connected thereunder by securing a continuous mesh pocket or individual pockets 33 offering support to the eggs 47 which may be placed therein.

The element 29 is similar in construction to the element 28 with the exception that the openings 48 are somewhat larger than the openings 30 in order to accommodate the poaching unit structure, generally, designated 34 which will be hereinafter described, and the said element 29 is not provided with mesh pockets, the only differences existent in the two structures.

The said structures 28 and 29 are provided with foot-like supports 32 formed substantially as shown in order to support the same on the bottom 16 of the unit 11. It is to be noted, that they are so arranged and may be provided with handles so that they can easily be removed from the confines of the compartment within the section 11 when the eggs have been cooked, so that the same, particularly the element 28 may be placed under the cold water tap for cooling the eggs preparatory to opening and consumption.

The poaching unit 34 is comprised of two hollow semi-cylindrical sections 35 and 36 which are reinforced at the bottom by a beaded portion so as to raise the bottom 44 slightly and thus act as a reinforcement for the lower section of the unit. The upper portion of the unit is also beaded at 46 and two side openings 45 are indicated to permit circulation of the liquid, or water, used for the cooking operation. The bottom portion 44 is preferably perforated as shown at 44', the two semi-cylindrical sections, namely 35 and 36, being articulately secured by virtue of the pivot pin 49 riveted in place offering sufficient freedom of rotation to the lugs 50 and 51 permitting articulate action as shown in Figure 3 by the dotted lines.

Two handle elements 37 and 38 having extensions 62 are spot-welded one to each half section of the poaching unit, and are provided with angularly disposed handle portions 39 and 40, confining a recess therebetween, and permitting a spring element 41 to be mounted therein, having the extensions 43 and 42 anchored in such a position as to normally maintain the poaching unit closed as indicated by the full lines in Figures 3 and 4.

When the egg is broken and allowed to occupy the bottom 44 of the poaching unit, the very minute holes 44' will permit the liquid to circulate somewhat below the egg enough to free the egg from adhering to the bottom surface 44, so that when the operation is completed and the poaching unit 34 is removed from the cavity 48, the egg may then be released freely in the same upright position in which it is desired to have it, namely, with the yolk on top and the white portion below, hence by compressing the handles 39 and 40, the unit is opened to the dotted line indicated allowing the egg to be carefully deposited on a slice of bread, or toast, or on a plate.

In Figure 7, all the elements and units assembled in my device are indicated and a cover 54 is supplied, the same having an inwardly formed beaded portion 55 to locate against the beaded portion 14 of the element 11. The said cover 54 is provided with a suitable handle 56 held in place by a screw 57 or other similar securing means.

The frying pan is dismantled by grasping the pan element 23 having the threaded extension 24 which is suitably threaded as indicated at 26 in order to remove the threaded extension 27 of the handle 25. The handle is inserted therein when in actual use as shown in Figure 1. When the device is to be put away after use or for transporting purposes, the handle is removed from the pan proper and the handle may be positioned as shown in Figure 7 for a compact assemblage of all the elements to be retained for storage purposes. The lower element 12 is provided with an inwardly beaded portion 21 in order to fit frictionally in the reinforced flange portion 15 of the element 11.

A simple modification of the poaching unit 34 is shown in Figure 8, wherein I indicate an egg boiling support comprised of a handle 58 and an angular ring 60 having a depending flange 61 to which is secured a hemispherical mesh basket 59 so that the combination when so set up may be placed in an ordinary pan of water and heated over the gas flames. When an egg is supported in the mesh portion 59, it may be boiled and conveniently removed after the operation is completed.

The poaching unit 34 may be used otherwise for poaching in the same pan or culinary utensil for the purpose, but when it is desired to poach, fry or boil eggs, the device shown in Figure 1 would be most beneficial, the egg being placed for boiling in the mesh pocket 33, the frying pan 23 being supported on the surface 22 containing the heating means, and it is to be noted in Figure 2 that the liquid level 63 is not above the top surface 22 of the heating means.

Altho, I have herein described the nature and operation of my invention in rather succinct terms, and inasmuch as the same is susceptible of many modifications, alterations, and improvements, I reserve the right to all modifications, alterations, and improvements coming within the scope and spirit of my invention, also those embraced impliedly in the accompanying drawings, and as well those falling within the purview of the foregoing description; my invention to be limited to the appended claims.

Having thus described and revealed my invention, what I claim as novel and desire to secure by Letters Patent is:

1. A device of the character described comprising, a body having a recessed compartment and centrally disposed heating means therein, an egg supporting member removably positioned in said compartment provided with a series of openings, a mesh pocket secured below the said openings, a second supporting member removably positioned in said compartment adjacent the said first-mentioned egg supporting member also provided with a series of openings, each of the said supporting members occupying substantially one-half of the area of the base of said body, being also suitably cut away to clear the said heating means, the said second supporting member constructed and arranged to receive removably therein at least one egg poaching unit, egg poaching means removably confined within the said openings of the said second supporting member, the said heating means adapted to heat a liquid contained by the said body and further adapted to transmit heat by conduction to a cooking utensil placed thereon, and an egg poaching unit.

2. A device of the character described comprising, a body having a recessed compartment and centrally disposed heating means therein, an egg supporting member removably positioned in said compartment provided with a series of openings, a mesh pocket secured below the said openings, a second supporting member removably positioned in said compartment adjacent the said first-mentioned egg supporting member also provided with a series of openings, each of the said supporting members occupying substantially one-half of the area of the base of said body, being also suitably cut away to clear the said heating means, the said second supporting member constructed and arranged to receive removably therein at least one egg poaching unit, egg poaching means removably confined within the said openings of the said second supporting member, the said heating means adapted to heat a liquid contained by the said body and further adapted to transmit heat by conduction to a cooking utensil placed thereon, and an egg poaching unit, the said heating means provided with electrical connecting means adapted to connect the same to an electrical source of supply.

3. A device of the character described comprising, a body having a recessed compartment and centrally disposed heating means therein, an egg supporting member removably positioned in said compartment provided with a series of openings, a mesh pocket secured below the said openings, a second supporting member removably positioned in said compartment adjacent the said first-mentioned egg supporting member also provided with a series of openings, each of the said supporting members occupying substantially one-half of the area of the base of said body, being also suitably cut away to clear the said heating means, the said second supporting member constructed and arranged to receive removably therein at least one egg poaching unit, egg poaching means removably confined within the said openings of said second supporting member, the said heating means adapted to heat a liquid contained by the said body and further adapted to transmit heat by conduction to a cooking utensil placed thereon, and an egg poaching unit.

4. A device of the character described comprising, a body having a recessed compartment and centrally disposed heating means therein, an egg supporting member removably positioned in said compartment provided with a series of openings, a mesh pocket secured below the said openings, a second supporting member removably positioned in said compartment adjacent the said first-mentioned egg supporting member also provided with a series of openings, each of the said supporting members occupying substantially one-half of the area of the base of said body, being also suitably cut away to clear the said heating means, the said second supporting member constructed and arranged to receive removably therein at least one egg poaching unit, egg poaching means removably confined within the said openings of the said second supporting member, the said heating means adapted to heat a liquid contained by the said body and further adapted to transmit heat by conduction to a cooking utensil placed thereon, and an egg poaching unit, the said heating means provided with electrical connecting means adapted to connect the same to an electrical source of supply.

5. A device of the character described comprising, a body having a recessed compartment and centrally disposed heating means therein, an egg supporting member removably positioned in said compartment provided with a series of openings, a mesh pocket secured below the said openings, a second supporting member removably positioned in said compartment adjacent the said first mentioned egg supporting member also provided with a series of openings, each of the said supporting members occupying substantially one-half of the area of the base of the said body, being also suitably cut away to clear the said heating means, the said second supporting member constructed and arranged to receive removably therein at least one egg poaching unit, egg poaching means removably confined within the said openings of the said second supporting member, the said heating means adapted to heat a liquid contained by the said body and further adapted to transmit heat by conduction to a cooking utensil placed thereon, and an egg poaching unit, the said compartment adapted to hold a liquid heating medium the surface level thereof being maintained substantially level with the top surface of the said heating means.

6. A device of the character described comprising, a body having a recessed compartment and centrally disposed heating means therein, an egg supporting member removably positioned in said compartment provided with a series of openings, a mesh pocket secured below the said openings, a second supporting member removably positioned in said compartment adjacent the said first-mentioned egg supporting member also provided with a series of openings, each of the said supporting members occupying substantially one-half of the area of the base of the said body, being also suitably cut away to clear the said heating means, the said second supporting member constructed and arranged to receive removably therein at least one egg poaching unit, egg poaching means removably confined within the said openings of the said second supporting member, the said heating means adapted to heat a liquid contained by the said body and further adapted to transmit heat by conduction to a cooking utensil placed thereon, and an egg poaching unit, the said heating means provided with electrical connecting means adapted to connect the same to an electrical source of supply, the said compartment adapted to hold a liquid heating medium the surface level thereof being maintained substantially level with the top surface of the said heating means.

7. A device of the character described comprising, a body having a recessed compartment and centrally disposed heating means therein, an egg supporting member removably positioned in said compartment provided with a series of openings, a mesh pocket secured below the said openings, a second supporting member removably positioned in said compartment adjacent the said first-mentioned egg supporting member also provided with a series of openings, each of the said supporting members occupying substantially one-half of the area of the base of the said body, being also suitably cut away to clear the said heating means, the said second supporting member constructed and arranged to receive removably therein at least one egg poaching unit, egg poaching means removably confined within the said openings of the said heating means, the said compartment adapted to hold a liquid heating medium the surface level thereof being maintained substantially level with the top surface of the said heating means.

8. A device of the character described comprising, a body having a recessed compartment and centrally disposed heating means therein, an egg supporting member removably positioned in said compartment provided with a series of openings, a mesh pocket secured below the said openings, a second supporting member removably positioned in said compartment adjacent the said first-mentioned egg supporting member also provided with a series of openings, each of the said supporting members occupying substantially one-half of the arrangement of the base of the said body, being also suitably cut away to clear the said heating means, the said second supporting member constructed and arranged to receive removably therein at least one egg poaching unit, egg poaching means removably confined within the said openings of the said second supporting member, the said heating means adapted to heat a liquid contained by the said body and further adapted to transmit heat by conduction to a cooking utensil placed thereon, and an egg poaching unit, the said heating means provided with electrical connecting means adapted to connect the same to an electrical source of supply, the said compartment adapted to hold a liquid heating medium the surface thereof being maintained substantially level with the top surface of the said heating means.

SIDNEY CAPLAN.

REFERENCES CITED

The following references are of record in the file of this patent:

UNITED STATES PATENTS

| Number | Name | Date |
|---|---|---|
| 655,462 | Smith | Aug. 7, 1900 |
| 1,587,023 | Mottlau | June 1, 1926 |
| 654,046 | Arthurs | July 17, 1900 |
| 982,044 | Felger | Jan. 17, 1911 |

FOREIGN PATENTS

| Number | Country | Date |
|---|---|---|
| 639,667 | France | Mar. 13, 1928 |
| 267,627 | Italy | Sept. 13, 1929 |
| 237,068 | Germany | July 21, 1911 |